United States Patent
Zhang

(10) Patent No.: US 7,885,476 B2
(45) Date of Patent: Feb. 8, 2011

(54) SYSTEM AND METHOD FOR EFFECTIVELY PERFORMING AN ADAPTIVE ENCODING PROCEDURE

(75) Inventor: Ximin Zhang, San Jose, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 1085 days.

(21) Appl. No.: 11/638,810

(22) Filed: Dec. 14, 2006

(65) Prior Publication Data

US 2008/0144951 A1    Jun. 19, 2008

(51) Int. Cl.
*G06K 9/36* (2006.01)
*G06K 9/46* (2006.01)

(52) U.S. Cl. .......... 382/239; 382/248; 382/251

(58) Field of Classification Search .......... 382/108, 382/239, 248, 250, 251, 286; 375/240.03, 375/240.24
See application file for complete search history.

(56) References Cited

U.S. PATENT DOCUMENTS

| | | |
|---|---|---|
| 2004/0008899 A1 | 1/2004 | Tourapis et al. |
| 2006/0126724 A1 | 6/2006 | Cote et al. |
| 2006/0268990 A1* | 11/2006 | Lin et al. ............ 375/240.24 |
| 2008/0080615 A1* | 4/2008 | Tourapis et al. ........ 375/240.03 |

FOREIGN PATENT DOCUMENTS

| | | |
|---|---|---|
| WO | WO2005079073 A1 | 8/2005 |
| WO | WO2006007279 A2 | 1/2006 |
| WO | WO2006007285 A1 | 1/2006 |

OTHER PUBLICATIONS

Thomas Wedi and Steffen Wittmann, Quantization Offsets for Video Coding, 2005, vol. 1, page No. 324-327.

* cited by examiner

*Primary Examiner*—Phuoc Tran
(74) *Attorney, Agent, or Firm*—Gregory J. Koerner; Redwood Patent Law

(57) ABSTRACT

A system and method for effectively performing an adaptive encoding procedure includes a texture analyzer that initially determines texture characteristics for blocks of input image data. An image transformer converts the blocks of image data into sets of coefficients that represent the various blocks. A block categorizer utilizes the texture characteristics to associate texture categories with the sets of coefficients from the various blocks. Deadzone tables are provided for storing deadzone values that define deadzone regions for performing appropriate quantization procedures. A quantizer may then access the deadzone values from the deadzone tables to adaptively convert the coefficients into quantized coefficients according to their corresponding texture characteristics.

30 Claims, 10 Drawing Sheets

318  Fig. 5

SYSTEM AND METHOD FOR EFFECTIVELY PERFORMING AN ADAPTIVE ENCODING PROCEDURE

BACKGROUND SECTION

1. Field of Invention

This invention relates generally to techniques for processing electronic information, and relates more particularly to a system and method for effectively performing an adaptive encoding procedure.

2. Description of the Background Art

Implementing effective methods for processing electronic information is a significant consideration for designers and manufacturers of contemporary electronic devices. However, effectively implementing electronic devices may create substantial challenges for device designers. For example, enhanced demands for increased device functionality and performance may require more system processing power and require additional hardware or software resources. An increase in processing or software requirements may also result in a corresponding detrimental economic impact due to increased production costs and operational inefficiencies.

Furthermore, enhanced device capability to perform various advanced operations may provide additional benefits to a system user, but may also place increased demands on the control and management of various system components. For example, an enhanced electronic device that effectively processes image data may benefit from an efficient implementation because of the large amount and complexity of the digital data involved.

Due to growing demands on system resources and substantially increasing data magnitudes, it is apparent that developing new techniques for implementing and utilizing electronic devices is a matter of concern for related electronic technologies. Therefore, for all the foregoing reasons, developing effective techniques for processing electronic information remains a significant consideration for designers, manufacturers, and users of contemporary electronic devices.

SUMMARY

In accordance with the present invention, a system and method are disclosed for effectively performing an adaptive encoding procedure. In one embodiment of the invention, an encoder initially receives pixel blocks of image data from any appropriate data source. A texture analyzer of a quantization module calculates texture characteristics for the pixel blocks by utilizing any appropriate techniques. For example, in certain embodiments, the texture analyzer calculates variance values to quantify the texture characteristics. The encoder then selects an image transform for further processing the pixel block into coefficients. In certain embodiments, a 4×4 Discrete Cosine Transform (DCT) is supported to process 4×4 pixel blocks of image data. In addition, in certain embodiments, an 8×8 DCT process is also supported for alternately processing 8×8 pixel blocks of image data into corresponding coefficients.

A block categorizer of the quantization module may perform a texture categorization procedure to associate sets of coefficients with corresponding deadzone tables based upon the specific texture characteristics represented by the appropriate variance values. In certain embodiments, the block categorizer compares block variance values to predefined texture threshold values for determining to which texture category a given block is correctly associated. In certain embodiments, the deadzone tables include flat tables for blocks with flat texture characteristics, sensitive tables for blocks with subtle texture characteristics, moderate blocks for blocks with medium texture characteristics, and heavy tables for blocks with substantial texture characteristics.

In practice, the block categorizer determines whether a current block of coefficients is a flat block based upon predetermined texture classification criteria. If the current block is categorized as a flat block, then a quantizer accesses an appropriate flat table to obtain corresponding deadzone values. However, if the current block is not categorized as a flat block, then the block categorizer determines whether the current block of coefficients is a sensitive block based upon predetermined texture classification criteria. If the current block is categorized as a sensitive block, then the quantizer accesses an appropriate sensitive table to obtain corresponding deadzone values.

If the current block is not categorized as a sensitive block, then the block categorizer determines whether the current block of coefficients is a moderate block based upon predetermined texture classification criteria. If the current block is categorized as a moderate block, then the quantizer accesses an appropriate moderate table to obtain appropriate deadzone values. However, if the current block is not categorized as a moderate block, then the block categorizer determines whether the current block of coefficients is a heavy block based upon predetermined texture classification criteria. If the current block is categorized as a heavy block, then the quantizer accesses an appropriate heavy table to obtain appropriate deadzone values.

Finally, the quantizer utilizes the accessed deadzone values from the selected deadzone table to adaptively perform a quantization procedure upon the current block of coefficients to thereby produce quantized coefficients. Any remaining unprocessed blocks of coefficients may be processed in a similar manner. For at least the foregoing reasons, the present invention therefore provides an improved system and method for effectively performing an adaptive encoding procedure.

DETAILED DESCRIPTION

The present invention relates to an improvement in electronic information processing systems. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as system and method for effectively performing an adaptive encoding procedure, and includes a texture analyzer that initially determines texture characteristics for blocks of input image data. An image transformer converts the blocks of image data into sets of coefficients that represent the respective blocks. A block categorizer utilizes the texture characteristics to associate texture categories with the sets of coefficients from the blocks. Deadzone tables are provided for storing deadzone values to define deadzone regions for performing adaptive quantization procedures. A quantizer may then access the deadzone values from the deadzone tables to adaptively convert the coefficients into quantized coefficients according to their corresponding texture characteristics.

Figure 1:
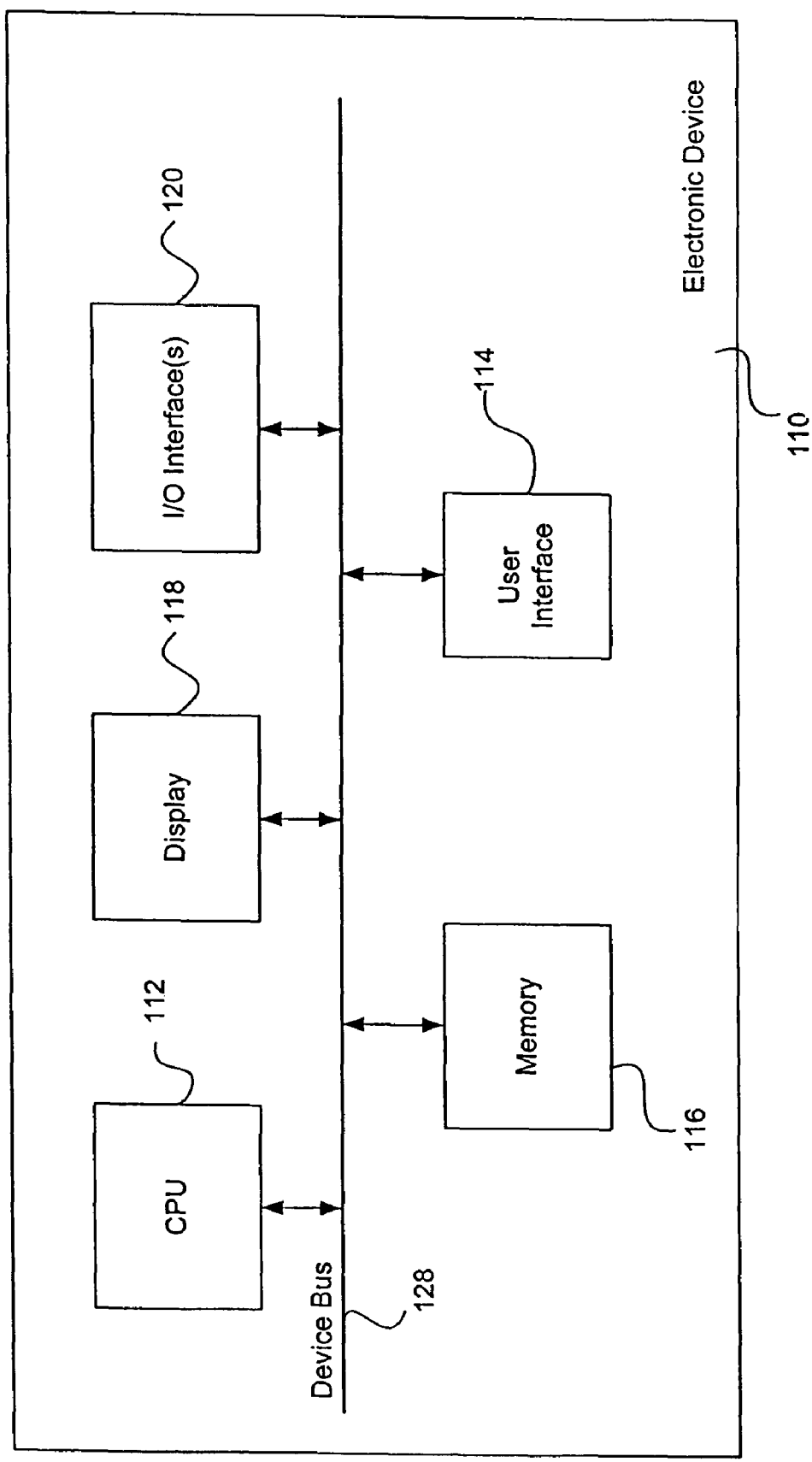
FIG. 1 is a block diagram for one embodiment of an electronic device, in accordance with the present invention.

Referring now to FIG. 1, a block diagram for one embodiment of an electronic device 110 is shown, in accordance with the present invention. In the FIG. 1 embodiment, electronic device 110 includes, but is not limited to, a central processing unit (CPU) 112, a user interface 114, memory 116, a display 118, and input/output interface(s) (I/O interface(s)) 120. The foregoing components of electronic device 110 may be coupled to, and communicate through, a device bus 128.

In various embodiments, electronic device 110 may be implemented as any appropriate type of electronic device or system. For example, electronic device 110 may be implemented as a computer device, a video camera, a digital still camera, a cellular telephone, or a personal digital assistant (PDA) device. In addition, electronic device 110 may be implemented using components and configurations in addition to, or instead of, certain of those components and configurations discussed below in conjunction with the FIG. 1 embodiment.

In the FIG. 1 embodiment, CPU 112 may be implemented to include any appropriate and compatible processor device that executes software instructions to control and manage the operations of electronic device 110. The FIG. 1 display 118 may include any effective type of display technology including a cathode-ray-tube monitor or a liquid-crystal display device. In the FIG. 1 embodiment, I/O interface(s) 120 may include one or more input and/or output interfaces to receive and/or transmit any required types of information to for from electronic device 110.

In the FIG. 1 embodiment, memory 116 may be implemented to include any combination of desired storage devices, including, but not limited to, read-only memory (ROM), random-access memory (RAM), and various types of non-volatile memory, such as floppy disks or hard disks. In the FIG. 1 embodiment, user interface 114 may include any effective means to allow a system user to communicate with electronic device 110. For example, user interface 114 may support a keyboard device, a wireless remote-control device, a speech-recognition module with corresponding microphone, or a graphical user interface with touch-screen capability. The functionality of instructions and information stored in memory 116 are further discussed below in conjunction with FIGS. 3, 5, and 7-10.

Figure 2:
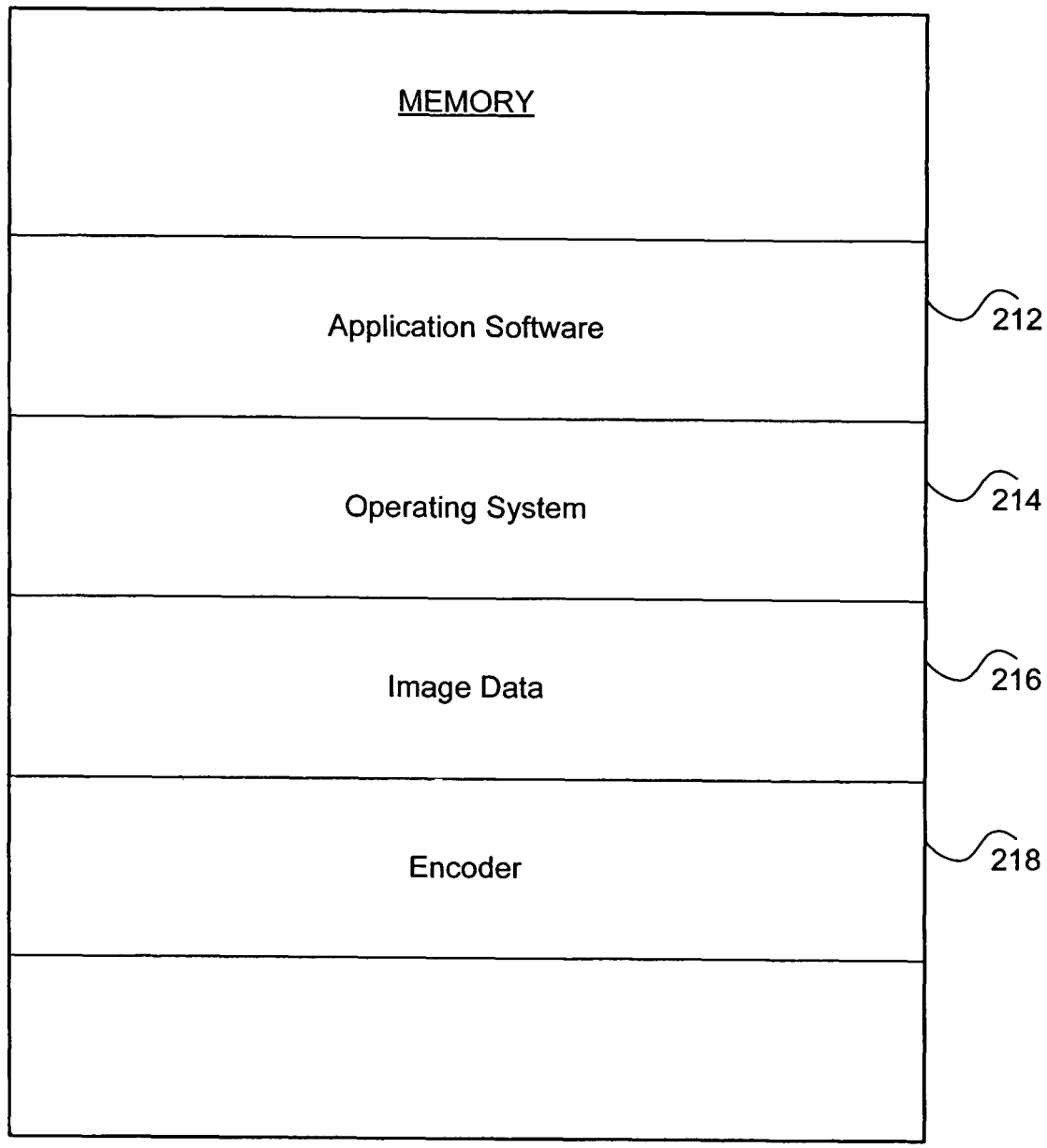
FIG. 2 is a block diagram for one embodiment of the memory of FIG. 1, in accordance with the present invention.

Referring now to FIG. 2, a block diagram of the FIG. 1 memory 116 is shown, in accordance with one embodiment of the present invention. In the FIG. 2 embodiment, memory 116 includes, but is not limited to, application software 212, an operating system 214, image data 216, and an encoder 218. In alternate embodiments, memory 116 may be implemented using components and configurations in addition to, or instead of, certain of those components and configurations discussed in conjunction with the FIG. 2 embodiment.

In the FIG. 2 embodiment, application software 212 may include program instructions that are preferably executed by CPU 112 (FIG. 1) to perform various functions and operations for electronic device 110. The particular nature and functionality of application software 212 typically varies depending upon factors such as the specific type and particular use of the corresponding electronic device 110. In the FIG. 2 embodiment, operating system 214 controls and coordinates low-level functionality of electronic device 110.

Image data 216 includes various types of captured image data or other information corresponding to images for display upon an appropriate display device. For example, in certain embodiments, image data 216 may include video data is encoded in any appropriate format. In the FIG. 2 embodiment, encoder 218 may be utilized to encode various types of image data 216 in any desired and supported encoding format. In alternate embodiments, the present invention may alternately be utilized to manage and process data types other than the image data 216 shown in FIG. 2. The effective implementation of encoder 218 is further discussed below in conjunction with FIG. 3.

Figure 3:
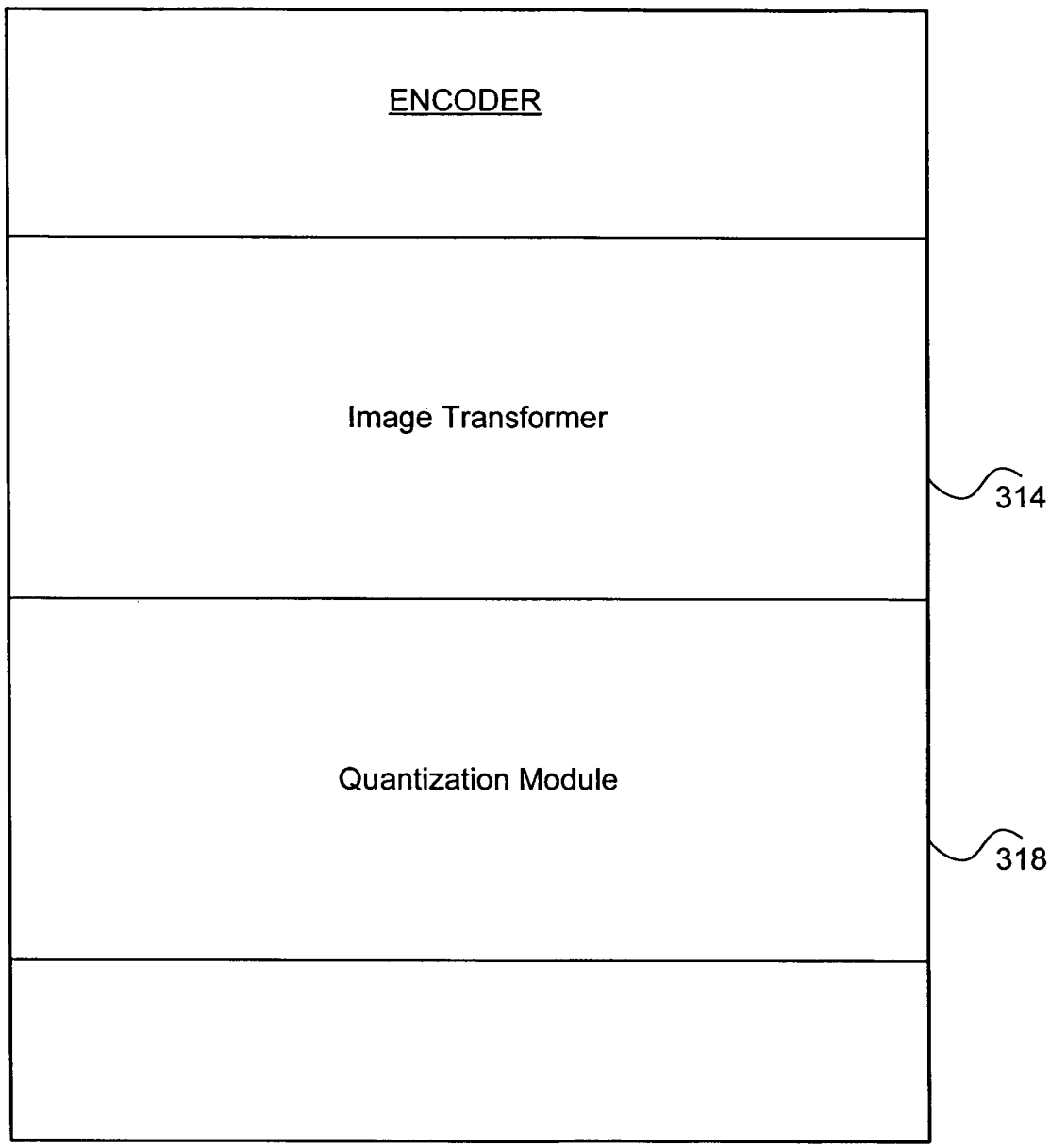
FIG. 3 is a block diagram for one embodiment of the encoder of FIG. 2, in accordance with the present invention.

Referring now to FIG. 3, a block diagram of the FIG. 2 encoder 218 is shown, in accordance with one embodiment of the present invention. In the FIG. 3 embodiment, encoder 218 includes, but is not limited to, an image transformer 314 and a quantization module 318. In alternate embodiments, encoder 218 may be implemented using components and configurations in addition to, or instead of, certain of those components and configurations discussed in conjunction with the FIG. 3 embodiment.

In the FIG. 3 embodiment, image transformer 314 performs an image transform procedure to convert pixels of image data include a series of coefficients in any effective manner. For example, in certain embodiments, image transformer 314 performs a known Discrete Cosine Transform (DCT) procedure according to a known Advanced Video Coding (AVC) standard. In certain embodiments, a video frame of image data may be divided into a series of contiguous macroblocks. For example, the foregoing macroblocks may be implemented as 16×16 macroblocks that are 16 pixels wide and sixteen pixels high. These macroblocks may then be subdivided into separate contiguous blocks. For example, a 16×16 macroblock may be divided into four 8×8 blocks or sixteen 4×4 blocks. After processing with image transformer 314, a given block of pixels is converted into a series of coefficients.

In the FIG. 3 embodiment, the quantizer module 318 receives the coefficients from image transformer 314, and performs an adaptive encoding procedure by utilizing appropriate adaptive quantization techniques to compress the coefficients into quantized coefficients. For example, in certain embodiments, quantizer module 318 performs quantization procedures using certain techniques from a known Advanced Video Coding (AVC) standard.

In the FIG. 3 embodiment, quantizer 318 produces the quantized coefficients by separately reducing the bit rate of the coefficients according to a compression ratio that is specified by a corresponding quantization parameter (QP). Additional details of AVC standard are discussed by the Joint Video Team (JVT) of ISO/IEC MPEG & ITU-T VCEG (ISO/IEC JTC1/SC29/WG11 and ITU-T SG16 Q.6), "Draft of Version 4 of H.264/AVC (ITU-T Recommendation H.264 and ISO/IEC 14496-10 (MPEG-4 part 10) Advanced Video Coding)" (Document: JVT-M050d1.doc).

In the FIG. 3 embodiment, encoder 218 is discussed in the context of processing image data. However, in alternate embodiments, certain concepts and techniques from the present invention may be similarly utilized for processing other types of electronic information. Certain techniques for utilizing encoder 218 to perform adaptive encoding procedures are further discussed below in conjunction with FIG. 8-10.

Figure 4:
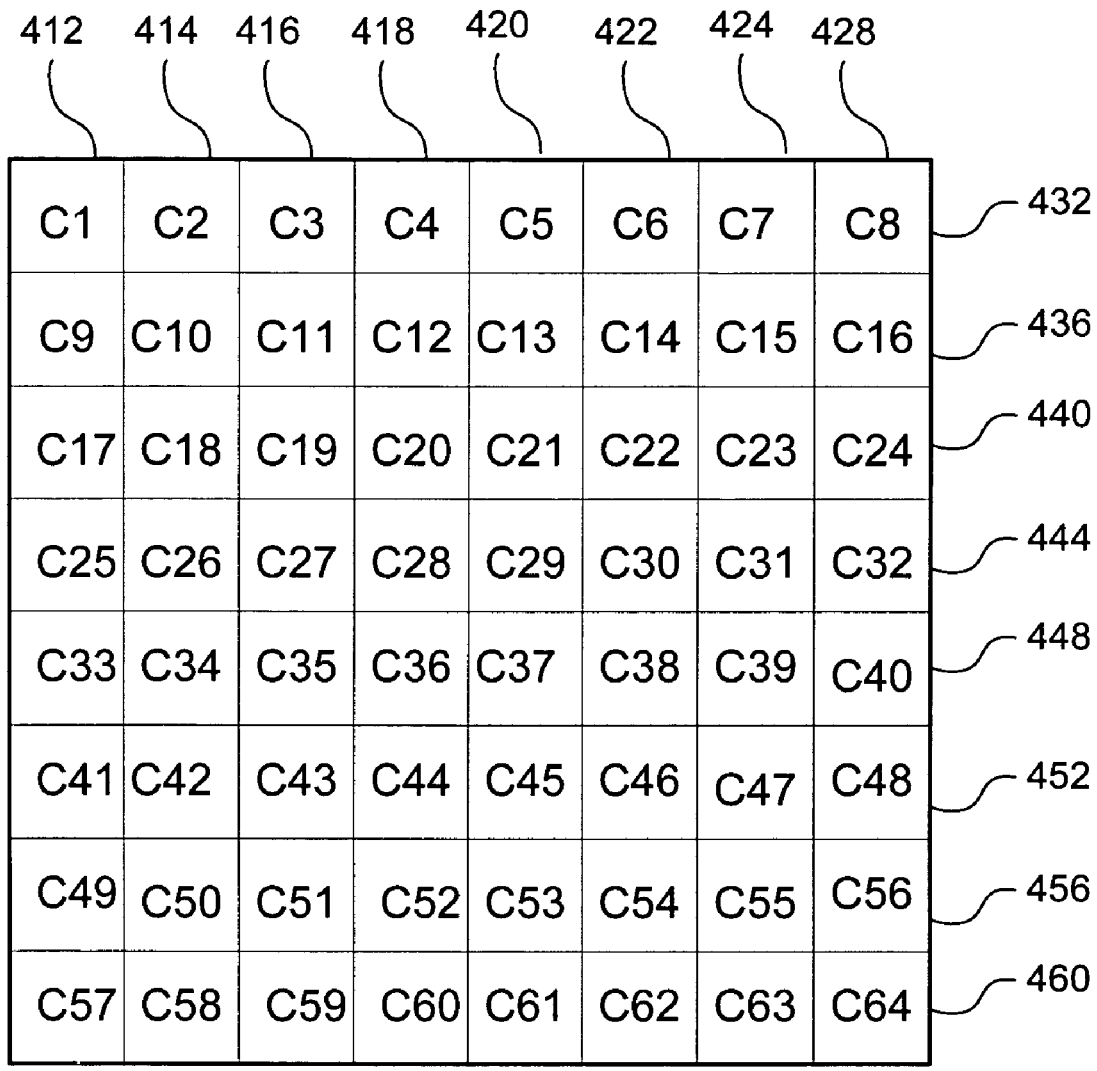
FIG. 4 is a diagram illustrating an exemplary set of coefficients, in accordance with one embodiment of the present invention.

Referring now to FIG. 4, a diagram illustrating an exemplary embodiment of coefficients 410 is shown, in accordance with one embodiment of the present invention. The FIG. 4 embodiment is presented for purposes of illustration, and in alternate embodiments, the present invention may utilize coefficients 410 that include elements and configurations in addition to, or instead of, certain of those elements and configurations discussed in conjunction with the FIG. 4 embodiment.

As discussed above in conjunction with FIG. 3, an image transformer 314 (FIG. 3) may perform an image transform procedure to convert blocks of image pixels into corresponding sets of coefficients 410. The FIG. 4 embodiment illustrates coefficients 410 for an 8×8 block of pixels that is initially eight pixels wide by eight pixels high before image transformer 314 performs the transform procedure to produce coefficients 410. In the FIG. 4 example, coefficients 410 therefore include sixty-four coefficients C1 through C64 that are arranged in a series of eight columns 412, 414, 416, 418, 420, 422, 424, and 428, and in a series of eight rows 432, 436, 440, 444, 448, 452, 456, and 460. For example, a first row 432 of coefficients 410 includes a first coefficient C1, a second coefficient C2, a third coefficient C3, a fourth coefficient C4, a fifth coefficient C5, a sixth coefficient C6, a seventh coefficient C 7, and an eight coefficient C8. Processing of coefficients 410 is further discussed below in conjunction with FIGS. 5 and 6.

Figure 5:
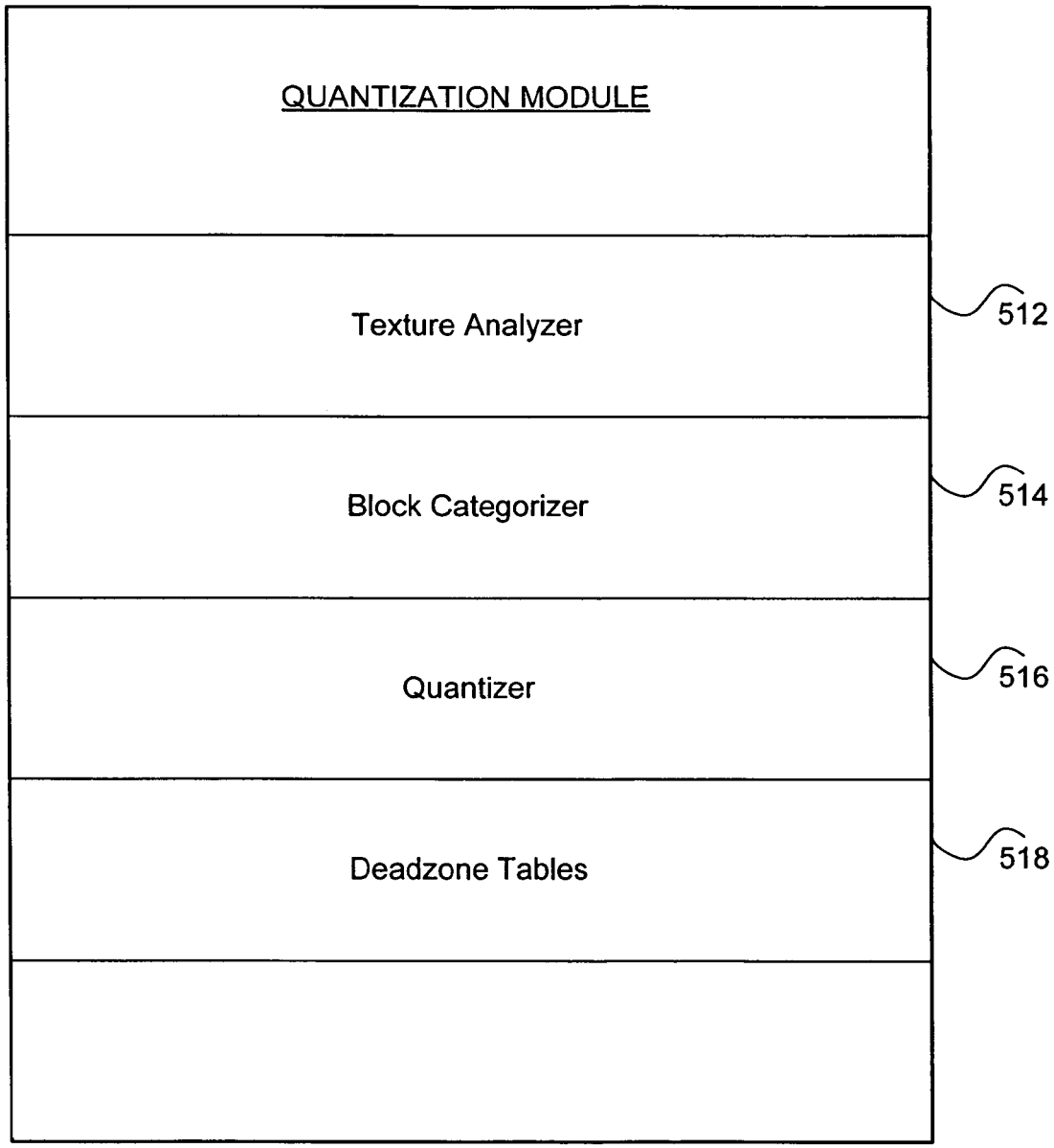
FIG. 5 is a block diagram for one embodiment of the quantization module of FIG. 3, in accordance with the present invention.

Referring now to FIG. 5, a block diagram for one embodiment of the FIG. 3 quantization module 318 is shown, in accordance with the present invention. In the FIG. 5 embodiment, quantization module 318 includes, but is not limited to, a texture analyzer 512, a block categorizer 514, a quantizer 516, and deadzone tables 518. In alternate embodiments, quantization module 318 may be implemented using components and configurations in addition to, or instead of, certain of those components and configurations discussed in conjunction with the FIG. 5 embodiment.

In the FIG. 5 embodiment, texture analyzer 512 may perform a block analysis procedure to determine texture characteristics of pixel blocks from input image data by utilizing any appropriate techniques. For example, in certain embodiments, texture analyzer 512 initially calculates a mean value for a given block according to the following formula:

$$MeanValue = \frac{\sum Xi}{N}$$

where "Xi" is a pixel value at a pixel location "i", and "N" is the total number of pixels in the given block.

The texture analyzer 512 may then use the foregoing mean value to calculate a corresponding variance value for the given block according to the following formula:

$$VarianceValue = \frac{\sum (Xi - MeanValue)^2}{N}$$

where "Xi" is a pixel value at a pixel location "i", "MeanValue" is an average pixel value for the given block, and "N" is the total number of pixels in the given block. Texture analyzer 512 may then utilize the calculated variance value to quantitatively represent texture characteristics for the given block.

In the FIG. 5 embodiment, block categorizer 514 may then utilize the variance values to categorize corresponding pixel blocks into appropriate pre-defined texture categories. In the FIG. 5 embodiment, deadzone tables 518 include a series of tables that each correspond with a different one of the pre-defined texture categories. Each deadzone table 518 includes a series of deadzone values that quantizer 516 may utilize for performing a quantization procedure upon the coefficients 410 previously discussed above in conjunction with FIG. 4. Additional details for the implementation and utilization of deadzone tables 518 are further discussed below in conjunction with FIGS. 7-9.

In the FIG. 5 embodiment, quantization module 318 is discussed in the context of processing image data. However, in alternate embodiments, certain concepts and techniques from the present invention may be similarly utilized for processing other types of electronic information. Furthermore, in the FIG. 5 embodiment, quantization module 318 is disclosed and discussed as being implemented primarily as software instructions. However, in alternate embodiments, some or all of the functions of the present invention may be performed by appropriate electronic circuits or devices that are configured to effectively perform various functions discussed herein.

Figure 6:
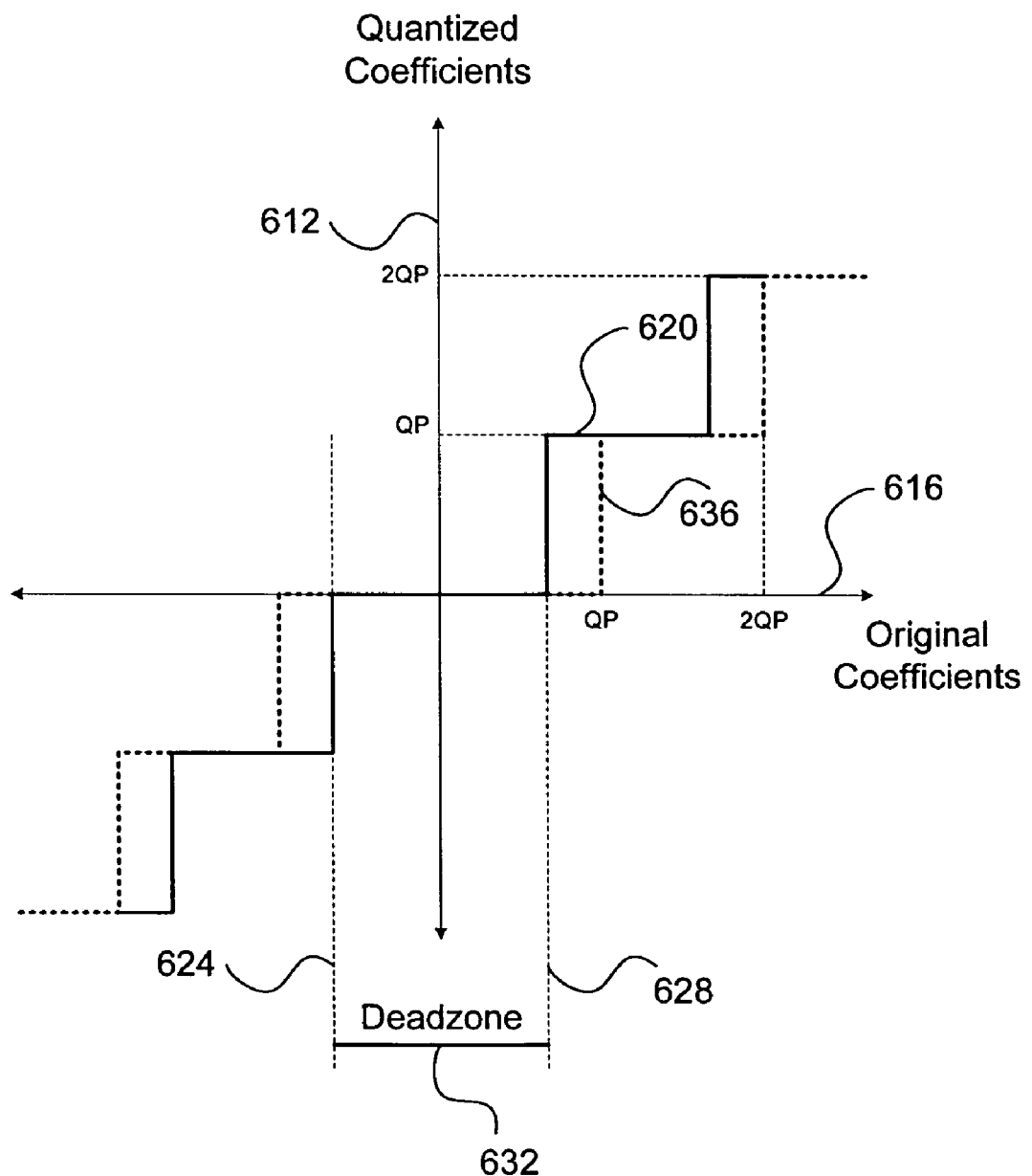
FIG. 6 is a graph illustrating a deadzone region, in accordance with one embodiment of the present invention.

Referring now to FIG. 6, a graph illustrating a deadzone region 632 is shown, in accordance with one embodiment of the present invention. The FIG. 6 graph is presented to illustrate certain principles of the present invention, and in alternate embodiments, the present invention may utilize deadzones 632 with values and configurations in addition to, or instead of, certain of those values and configurations discussed in conjunction with the FIG. 6 embodiment.

The FIG. 6 graph displays original coefficients 410 (FIG. 4) upon a horizontal axis 616, and quantized coefficients upon a vertical axis 612. In the FIG. 6 embodiment, quantizer 516 (FIG. 5) performs a quantization procedure that may be expressed according to the following formula:

$$QuantizedCoefficient = \frac{(OriginalCoefficient + F(i))}{QP}$$

where "F(i)" is a deadzone value, and QP is a quantization parameter that quantizer 516 utilizes for performing the quantization procedure to convert an original coefficient into a quantized coefficient.

In the FIG. 6 graph, a staircase-shaped example 620 (solid line) illustrates a quantization procedure utilizing an exemplary deadzone region 632 that is bounded by axis 624 and axis 628. The FIG. 6 graph also shows a second staircase-shaped example 636 (dotted line) depicting a quantization procedure with a deadzone region of the quantization parameter times 2 (2QP) (deadzone value equal to zero). As shown in FIG. 6, in deadzone region 632, regardless of what value the original coefficients have, the quantized coefficients are always equal to zero, and are therefore disregarded during quantization. In general, the larger the deadzone value (F(i)), the smaller the deadzone region 632.

In conventional encoding systems, a single unchanging deadzone value is typically utilized. However, this uncompromising approach may result in significant loss of texture characteristics and other visual information after performance of the quantization procedures. In accordance with the present invention, quantization module 318 (FIG. 5) may adaptively select different deadzone values, on a coefficient-by-coefficient basis, based upon texture characteristics and other relevant information.

In certain embodiments, quantization module 318 may perform an adaptive encoding procedure according to the following formula:

$$Z = \lfloor (|W| + f(i)*(1 << q\_bits)) >> q\_bits \rfloor * \text{sgn}(W)$$

where "Z" is a quantized coefficient, "W" is an original coefficient 410 (FIG. 4), "f(i)" is a deadzone value for a coefficient "i", "q_bits" is a standard value based upon the quantization parameter (QP) and a current coefficient position, and "sgn(W)" is the initial sign of original coefficient "W."

In certain other embodiments, in order to relieve the computational complexity of floating point multiplication, quantization module 318 may define a modified deadzone value F(i) to be equal to the foregoing deadzone value f(i) times 1024 (2 to the $10^{th}$ power) that is rounded (either up or down) to the nearest integer. In this embodiment, quantization module 318 may therefore perform the adaptive encoding procedure according to the following formula:

$$Z = \lfloor (|W| + F(i)*(1 << q\_bits - 10)) >> q\_bits \rfloor * \text{sgn}(W)$$

where "Z" is a quantized coefficient, "W" is an original coefficient 410 (FIG. 4), "F(i)" is a modified deadzone value for a coefficient "i", "q_bits" is a standard value based upon the quantization parameter (QP) and a current coefficient position, and "sgn(W)" is the initial sign of original coefficient "W." Additional details for advantageously performing encoding procedures with adaptive deadzone values are further discussed below in conjunction with FIGS. 8-10.

Figure 7:
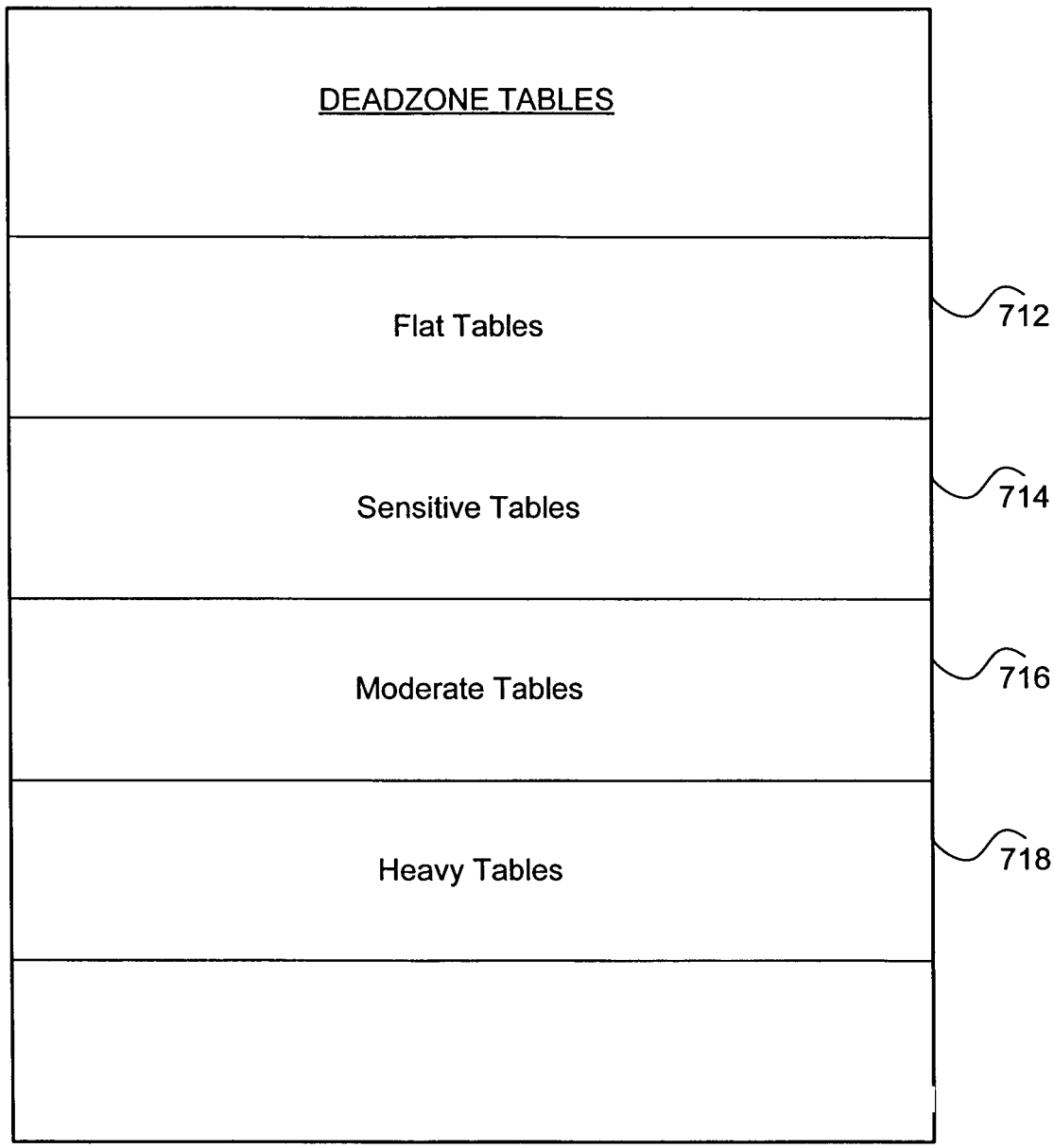
FIG. 7 is a block diagram for one embodiment of the deadzone tables of FIG. 5, in accordance with the present invention.

Referring now to FIG. 7, a block diagram for one embodiment of the FIG. 5 deadzone tables 518 is shown, in accordance with the present invention. In the FIG. 7 embodiment, deadzone tables 518 include, but are not limited to, flat tables 712, sensitive tables 714, moderate tables 716, and heavy tables 718. In alternate embodiments, deadzone tables 518 may be implemented using components and functionalities in addition to, or instead of, certain of those components and functionalities discussed in conjunction with the FIG. 7 embodiment. For example, any number and/or categories for alternately implementing deadzone tables 518 are also contemplated.

In the FIG. 7 embodiment, tables 712, 714, 716, and 718 are implemented as arrays of deadzone values that each correspond to a different respective coefficient 410 (FIG. 4) produced by image transformer 314 (see FIG. 3). In certain embodiments, quantizer 516 (FIG. 5) may select one of the four tables 712, 714, 716, and 718 to access corresponding deadzone values for performing an adaptive encoding procedure upon coefficients 410 from a given block of image data.

In the FIG. 7 embodiment, flat tables 712 store deadzone values for blocks with flat (very little) texture characteristics.

Similarly, sensitive tables 714 store deadzone values for blocks with sensitive (subtle) texture characteristics that are not absolutely flat. In addition, moderate tables 716 store deadzone values for blocks with moderate texture characteristics that fall within a medium range. Finally, heavy tables 718 store deadzone values for blocks with heavy or very pronounced texture characteristics. In the FIG. 7 embodiment, quantizer 516 may select an appropriate one of tables 712, 714, 716, and 718 to access deadzone values based upon texture characteristics of a given block of image data.

A series of Tables I through X are provided below to illustrate exemplary deadzone values for deadzone tables 712, 714, 716, and 718. In certain embodiments, the following Tables are utilized in accordance with an Advanced Video Coding (AVC) standard to process 8×8 blocks and 4×4 blocks of image data that are from either I frames, P frames, or B frames. If the following Tables are for processing I frames, they are designated with the word "intra," while Tables for processing P frames or B frames are designated with the word "inter."

Furthermore, certain deadzone values in the following Tables (those for processing 8×8 blocks of image data) are arranged in a matrix that is similar to the physical arrangement of rows and columns shown in FIG. 4 for coefficients 410 (eight rows and eight columns). In accordance with the present invention, a given deadzone value from the following Tables is therefore utilized by quantizer 518 for process a correspondingly-positioned coefficient 410 shown in FIG. 4.

TABLE I

Intra Sensitive Table:

{384, 384, 512, 512, 341, 341, 256, 256,
384, 512, 512, 341, 341, 256, 256, 205,
512, 512, 341, 341, 256, 256, 205, 205,
512, 341, 341, 256, 256, 205, 205, 170,
341, 341, 256, 256, 205, 205, 170, 170,
341, 256, 256, 205, 205, 170, 170, 146,
256, 256, 205, 205, 170, 170, 146, 146,
256, 205, 205, 170, 170, 146, 146, 146}

TABLE II

Intra Moderate Table:

{384, 512, 512, 384, 341, 341, 256, 256,
512, 512, 384, 341, 341, 256, 256, 205,
512, 384, 341, 341, 256, 256, 205, 205,
384, 341, 341, 256, 256, 205, 205, 170,
341, 341, 256, 256, 205, 205, 170, 170,
341, 256, 256, 205, 205, 170, 170, 146,
256, 256, 205, 205, 170, 170, 146, 146,
256, 205, 205, 170, 170, 146, 146, 146}

TABLE III

Intra Flat Table:

{512, 512, 384, 384, 341, 341, 256, 256,
512, 384, 384, 341, 341, 256, 256, 205,
384, 384, 341, 341, 256, 256, 205, 205,
384, 341, 341, 256, 256, 205, 205, 170,
341, 341, 256, 256, 205, 205, 170, 170,
341, 256, 256, 205, 205, 170, 170, 146,
256, 256, 205, 205, 170, 170, 146, 146,
256, 205, 205, 170, 170, 146, 146, 146}

TABLE IV

Intra Heavy Table:

{384, 384, 341, 341, 341, 341, 341, 256,
384, 341, 341, 341, 341, 341, 256, 256,
341, 341, 341, 341, 341, 256, 256, 205,
341, 341, 341, 341, 256, 256, 205, 170,
341, 341, 341, 256, 256, 205, 170, 170,
341, 341, 256, 256, 205, 170, 170, 146,
341, 256, 256, 205, 170, 170, 146, 146,
256, 256, 205, 170, 170, 146, 146, 146}

TABLE V

Inter Sensitive Table:

{341, 341, 384, 341, 256, 205, 170, 170,
341, 384, 341, 256, 205, 170, 170, 170,
384, 341, 256, 205, 170, 170, 170, 146,
341, 256, 205, 170, 170, 170, 146, 128,
256, 205, 170, 170, 170, 146, 128, 128,
170, 170, 170, 170, 146, 128, 128, 128,
170, 170, 170, 146, 128, 128, 128, 128,
170, 170, 146, 128, 128, 128, 128, 128}

TABLE VI

Inter Moderate Table:

{341, 384, 341, 256, 205, 170, 170, 170,
384, 341, 256, 205, 170, 170, 170, 170,
341, 256, 205, 170, 170, 170, 170, 146,
256, 205, 170, 170, 170, 170, 146, 128,
205, 170, 170, 170, 170, 146, 128, 128,
170, 170, 170, 170, 146, 128, 128, 128,
170, 170, 170, 146, 128, 128, 128, 128,
170, 170, 146, 128, 128, 128, 128, 128}

TABLE VII

Inter Flat Table:

{384, 341, 256, 205, 170, 170, 170, 170,
341, 256, 205, 170, 170, 170, 170, 170,
256, 205, 170, 170, 170, 170, 170, 146,
205, 170, 170, 170, 170, 170, 146, 128,
170, 170, 170, 170, 170, 146, 128, 128,
170, 170, 170, 170, 146, 128, 128, 128,
170, 170, 170, 146, 128, 128, 128, 128,
170, 170, 146, 128, 128, 128, 128, 128}

TABLE VIII

Inter Heavy Table:

{341, 341, 256, 205, 170, 170, 170, 170,
341, 256, 205, 170, 170, 170, 170, 170,
256, 205, 170, 170, 170, 170, 170, 146,
205, 170, 170, 170, 170, 170, 146, 128,
170, 170, 170, 170, 170, 146, 128, 128,
170, 170, 170, 170, 146, 128, 128, 128,
170, 170, 170, 146, 128, 128, 128, 128,
170, 170, 146, 128, 128, 128, 128, 128}

TABLE IX

Intra 4 × 4 Table:

| | | | |
|---|---|---|---|
| 512 | 384 | 341 | 256 |
| 384 | 341 | 256 | 256 |
| 341 | 256 | 256 | 205 |
| 256 | 256 | 205 | 205 |

TABLE X

Inter 4 × 4 Table:

| | | | |
|---|---|---|---|
| 341 | 256 | 205 | 170 |
| 256 | 205 | 170 | 170 |
| 205 | 170 | 170 | 146 |
| 170 | 170 | 146 | 146 |

In the foregoing Tables 1-X, the deadzone values are implemented as the modified deadzone values, F(i), discussed above in conjunction with FIG. 6. In alternate embodiments, the deadzone values may be implemented to be any other effective deadzone values. The deadzone values may be selected by utilizing any appropriate selection criteria. For example, in certain embodiments, the deadzone values are selected empirically by utilizing human visual evaluation procedures and principles.

In one embodiment of the present invention, certain deadzone values are subject to a deadzone value emphasis procedure that increases the value of specific deadzone values that correspond to significant or visually important ones of the coefficients 410. The increase of a particular deadzone value causes a smaller deadzone region 632 (FIG. 6), and therefore results in a smaller loss of information from that coefficient 410. Any deadzone value may be subject to the foregoing deadzone value emphasis procedure. However, in certain embodiments, the emphasized (increased) deadzone values may correspond to coefficients 410 starting from a second coefficient position (C2 of FIG. 4), and including any number of subsequent and sequential coefficients 410 (for example, C3-C9 of FIG. 4). Additional techniques for utilizing deadzone tables 518 are further discussed below in conjunction with FIGS. 8-9.

Figure 8:
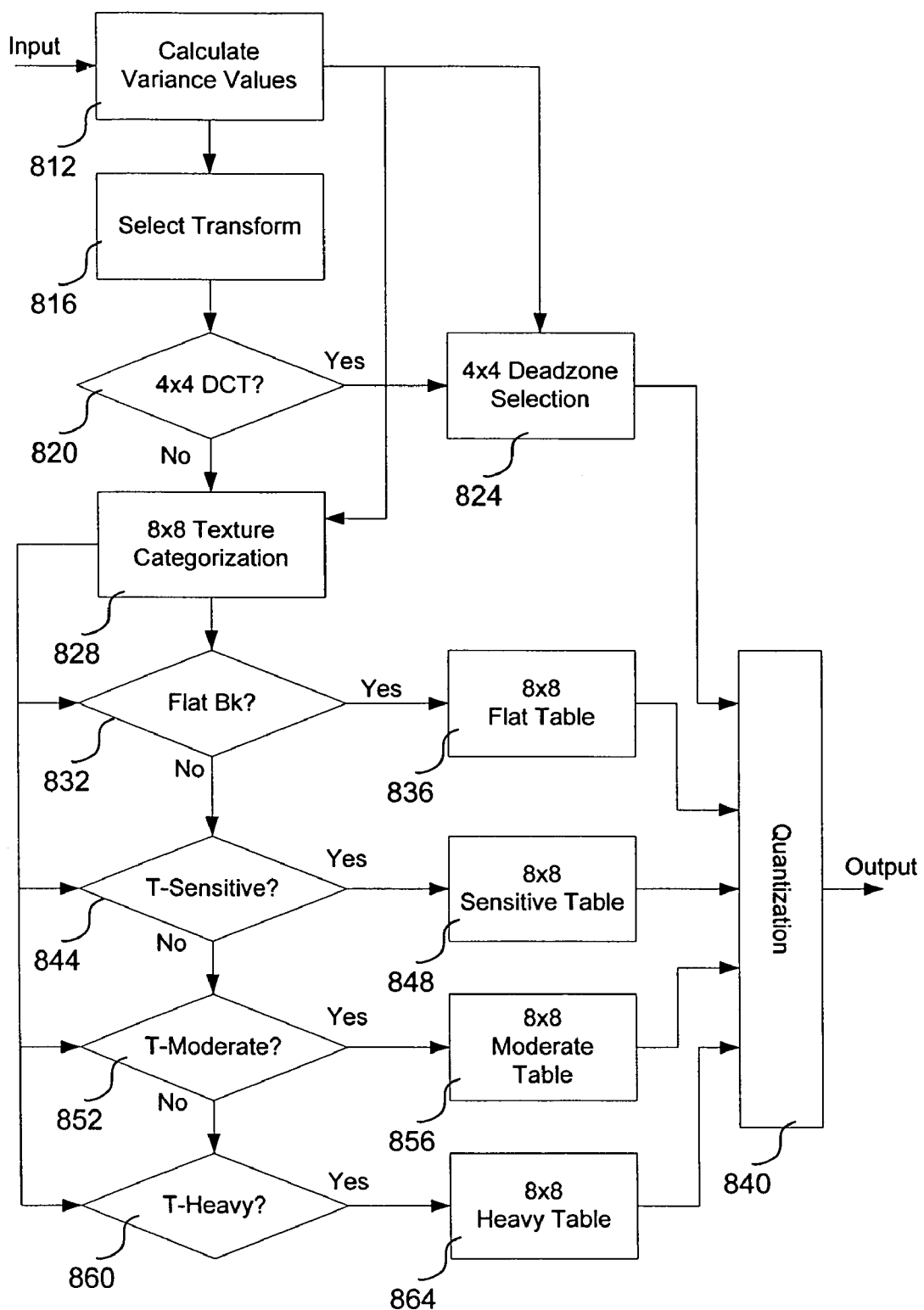
FIG. 8 is a flowchart of method steps for performing an adaptive encoding procedure, in accordance with one embodiment of the present invention.

Referring now to FIG. 8, a flowchart of method steps for performing an adaptive encoding procedure is shown, in accordance with one embodiment of the present invention. However, in alternate embodiments, the present invention may readily utilize steps and sequences other than certain of those steps and sequences discussed in conjunction with the FIG. 8 embodiment.

In the FIG. 8 embodiment, an encoder 218 initially receives pixel blocks of image data from any appropriate data source. In step 812, a texture analyzer 512 of a quantization module 318 calculates variance values for the pixel blocks by utilizing any appropriate techniques. Then, in step 816, encoder 218 selects an image transform for further processing the pixel blocks by utilizing any appropriate techniques. In step 820, an image transformer 314 of the encoder 218 determines whether a 4×4 Discrete Cosine Transform (DCT) has been selected to process 4×4 pixel blocks of image data, or whether an 8×8 DCT has been selected to process 8×8 pixel blocks of image data.

If a 4×4 DCT has been selected and performed by image transformer 314, then in step 824, a 4×4 deadzone selection procedure is performed to quantize 4×4 blocks of coefficients 410. The 4×4 deadzone selection and quantization procedure is further discussed below in conjunction with the FIG. 9 embodiment. However, if an 8×8 DCT has been selected and performed by image transformer 314, then in step 828, an 8×8 texture categorization procedure is performed by a block categorizer 514 of quantization module 318 to associate 8×8 blocks of coefficients 410 with corresponding deadzone tables 518 based upon the specific texture characteristics represented by the previously-calculated variance values. One technique for performing texture categorization procedures is further discussed below in conjunction with the FIG. 10 embodiment.

In step 832, block categorizer 514 determines whether a given block of coefficients 410 is a flat block based upon predetermined texture classification criteria. If the current block is categorized as a flat block, then in step 836, a quantizer 516 accesses an 8×8 flat table 712 to obtain appropriate deadzone values. In step 832, if the current block is not categorized as a flat block, then in step 844, block categorizer 514 determines whether the current block of coefficients 410 is a sensitive block based upon predetermined texture classification criteria. If the current block is categorized as a sensitive block, then in step 848, quantizer 516 accesses an 8×8 sensitive table 714 to obtain appropriate deadzone values.

In step 844, if the current block is not categorized as a sensitive block, then in step 852, block categorizer 514 determines whether the current block of coefficients 410 is a moderate block based upon predetermined texture classification criteria. If the current block is categorized as a moderate block, then in step 856, quantizer 516 accesses an 8×8 moderate table 716 to obtain appropriate deadzone values. In step 852, if the current block is not categorized as a moderate block, then in step 860, block categorizer 514 determines whether the current block of coefficients 410 is a heavy block based upon predetermined texture classification criteria. If the current block is categorized as a heavy block, then in step 864, quantizer 516 accesses an 8×8 heavy table 718 to obtain appropriate deadzone values.

Finally, in step 840, quantizer 516 utilizes the accessed deadzone values from the selected deadzone table 518 to adaptively perform a quantization procedure upon the current block of coefficients 410. Any other remaining unprocessed blocks of coefficients 410 may be processed in a similar manner. The present invention therefore provides an improved system and method for effectively performing an adaptive encoding procedure.

Figure 9:
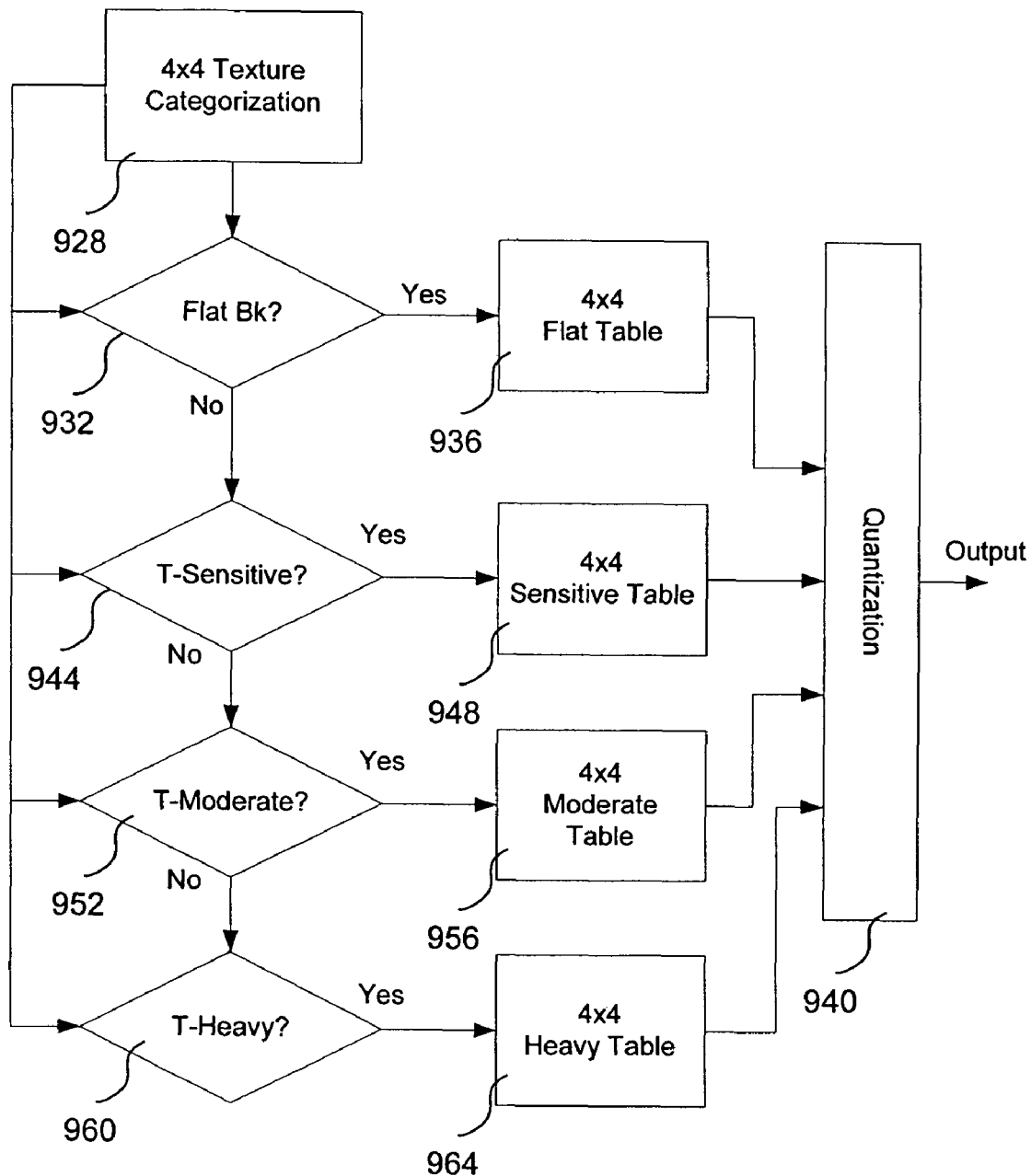
FIG. 9 is a flowchart of method steps for performing an adaptive encoding procedure on 4×4 blocks, in accordance with one embodiment of the present invention.

Referring now to FIG. 9, a flowchart of method steps for performing an adaptive encoding procedure on 4×4 blocks is shown, in accordance with one embodiment of the present invention. However, in alternate embodiments, the present invention may readily utilize steps and sequences other than certain of those steps and sequences discussed in conjunction with the FIG. 9 embodiment. The FIG. 9 process disclosed below corresponds to steps 824 and 840 from the encoding procedure previously described above in conjunction with the FIG. 8 embodiment.

In the FIG. 9 embodiment, if a 4×4 DCT has been selected and performed by image transformer 314 in steps 816 and 820 of FIG. 8, then in step 928, a 4×4 texture categorization procedure is performed by a block categorizer 514 of quantization module 318 to associate 4×4 blocks of coefficients 410 with corresponding deadzone tables 518 based upon the specific texture characteristics represented by the previously-calculated variance values. One technique for performing texture categorization procedures is further discussed below in conjunction with the FIG. 10 embodiment.

In step 932, block categorizer 514 determines whether a given block of coefficients 410 is a flat block based upon predetermined texture classification criteria. If the current block is categorized as a flat block, then in step 936, a quantizer 516 accesses a 4×4 flat table 712 to obtain appropriate deadzone values. In step 932, if the current block is not categorized as a flat block, then in step 944, block categorizer 514 determines whether the given block of coefficients 410 is a sensitive block based upon predetermined texture classification criteria. If the current block is categorized as a sensitive block, then in step 948, quantizer 516 accesses a 4×4 sensitive table 714 to obtain appropriate deadzone values.

In step 944, if the current block is not categorized as a sensitive block, then in step 952, block categorizer 514 determines whether the current block of coefficients 410 is a moderate block based upon predetermined texture classification criteria. If the current block is categorized as a moderate block, then in step 956, quantizer 516 accesses a 4×4 moderate table 716 to obtain appropriate deadzone values. In step 952, if the current block is not categorized as a moderate block, then in step 960, block categorizer 514 determines whether the current block of coefficients 410 is a heavy block based upon predetermined texture classification criteria. If the current block is categorized as a heavy block, then in step 964, quantizer 516 accesses a 4×4 heavy table 718 to obtain appropriate deadzone values.

Finally, in step 940, quantizer 516 utilizes the accessed deadzone values from the appropriate selected deadzone table 518 to adaptively perform a quantization procedure upon the current block of coefficients 410. Any other remaining unprocessed blocks of coefficients 410 may be processed in a similar manner. The FIG. 9 process may then terminate.

Figure 10:
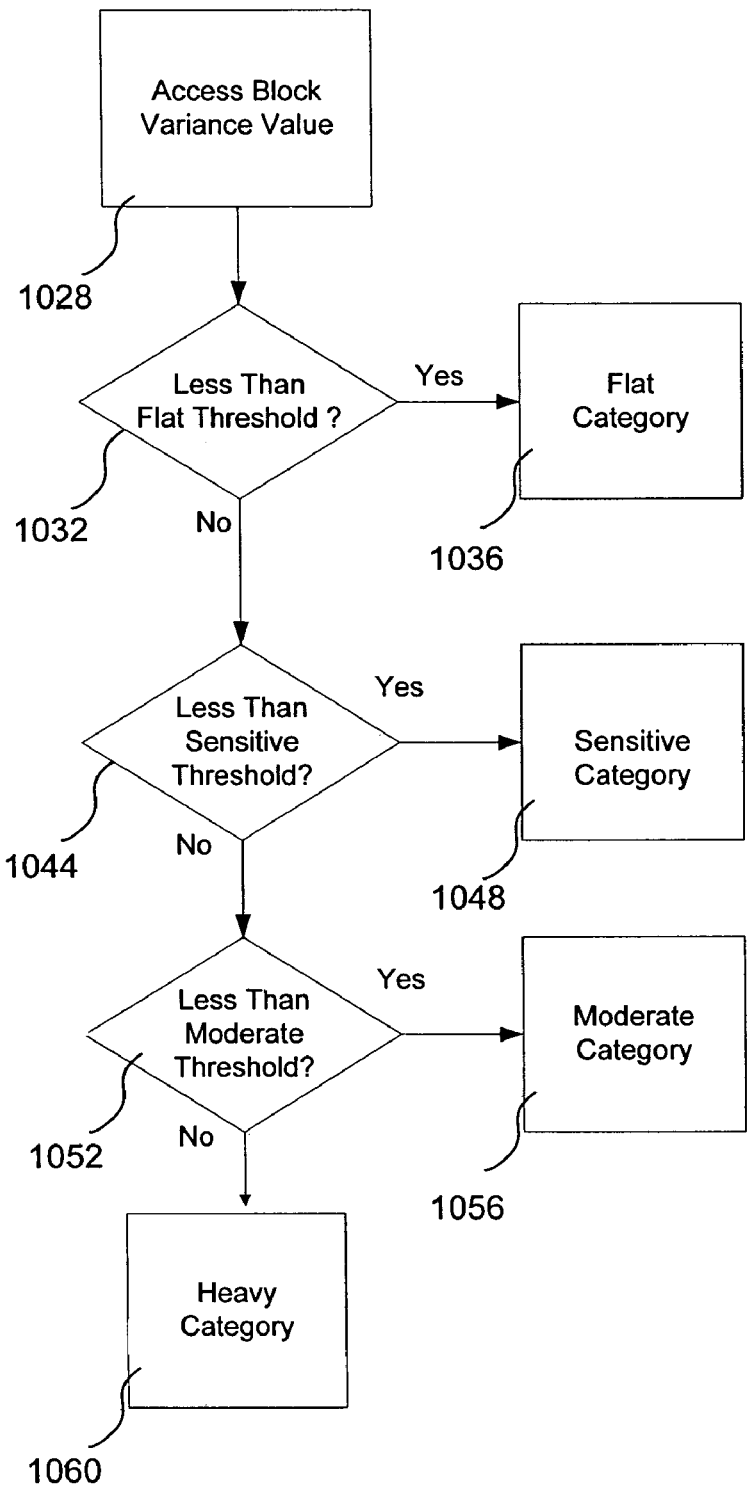
FIG. 10 is a flowchart of method steps for performing a texture categorization procedure, in accordance with one embodiment of the present invention.

Referring now to FIG. 10, a flowchart of method steps for performing a texture classification procedure is shown, in accordance with one embodiment of the present invention. However, in alternate embodiments, the present invention may readily utilize steps and sequences other than certain of those steps and sequences discussed in conjunction with the FIG. 10 embodiment.

In the FIG. 10 embodiment, a block categorizer 514 of quantization module 318 associates blocks of coefficients 410 with corresponding deadzone tables 518 based upon the specific texture characteristics that are represented by previously-calculated variance values. In step 1028, block categorizer 514 initially accesses block variance values that each corresponds with a respective associated block of coefficients 410.

In step 1032, block categorizer 514 determines whether a given block of coefficients 410 is less than a pre-defined flat threshold value. If the current block is less than the pre-defined flat threshold, then in step 1036, block categorizer 514 assigns the current block of coefficients 410 to a flat category that is associated with flat deadzone tables 712. In step 1032, if the current block is not categorized as a flat block, then in step 1044, block categorizer 514 determines whether a given block of coefficients 410 is less than a pre-defined sensitive threshold value. If the current block is less than the pre-defined sensitive threshold, then in step 1048, block categorizer 514 assigns the current block of coefficients 410 to a sensitive category that is associated with sensitive deadzone tables 714.

In step 1044, if the current block is not categorized as a sensitive block, then in step 1052, block categorizer 514 determines whether a given block of coefficients 410 is less than a pre-defined moderate threshold value. If the current block is less than the pre-defined moderate threshold, then in step 1056, block categorizer 514 assigns the current block of coefficients 410 to a moderate category that is associated with moderate deadzone tables 716. In step 1056, if the current block is not categorized as a moderate block, then in step 1052, block categorizer 514 assigns the current block of coefficients 410 to a heavy category that is associated with heavy deadzone tables 718. The FIG. 10 process may then terminate.

The invention has been explained above with reference to certain embodiments. Other embodiments will be apparent to those skilled in the art in light of this disclosure. For example, the present invention may readily be implemented using configurations and techniques other than certain of those described in the embodiments above. Additionally, the present invention may effectively be used in conjunction with systems other than certain of those described above. Therefore, these and other variations upon the discussed embodiments are intended to be covered by the present invention, which is limited only by the appended claims.

What is claimed is:

1. A system for performing an adaptive encoding procedure, comprising:
   a texture analyzer that determines texture characteristics for blocks of image data;
   an image transformer that converts said blocks of image data into coefficients that represent said blocks;
   a block categorizer that utilizes said texture characteristics to associate texture categories with said coefficients from said blocks;
   deadzone tables for storing deadzone values that define deadzone regions for performing a quantization procedure;
   a quantizer that accesses said deadzone values from said deadzone tables based upon said texture categories to convert said coefficients of said blocks into quantized coefficients; and
   a processor unit of an electronic device, said processor controlling processing functions of said texture analyzer, said image transformer, said block categorizer, and said quantizer to perform said adaptive encoding procedure.

2. The system of claim 1 wherein said image data is implemented to include frames of video image data.

3. The system of claim 1 wherein said image transformer and said quantizer utilize techniques from an Advanced Video Coding standard to convert said image data into said quantized coefficients.

4. The system of claim 1 wherein said blocks of image data include 8×8 blocks of image data and 4×4 blocks of image data, said 8×8 blocks being 8 pixels high by 8 pixels wide, said 4×4 blocks being 4 pixels high by 4 pixels wide.

5. The system of claim 1 wherein said image transformer performs a Discrete Cosine Transform procedure to convert said blocks into said coefficients.

6. The system of claim 1 wherein said texture categories include a flat texture category for flat texture characteristics, a sensitive texture category for subtle texture characteristics, a moderate texture category for medium texture characteristics, and a heavy texture category for substantial texture characteristics.

7. The system of claim 1 wherein said deadzone values define said deadzone regions in which said quantized coefficients are equal to a value of zero.

8. The system of claim 1 wherein said quantization procedure is performed according to a formula:

$$QuantizedCoefficient = \frac{(OriginalCoefficient + F(i))}{QP}$$

where said F(i) is one of said deadzone values for a corresponding one of said coefficients at a coefficient position "i", said QuantizedCoefficient is one of said quantized coefficients, said Original Coefficient is a corresponding unquantized one of said coefficients, and said QP is a quantization parameter that said quantizer utilizes to perform said quantization procedure to convert said OriginalCoefficient into said QuantizedCoefficient.

9. The system of claim 1 wherein said texture analyzer calculates said texture characteristics for one of said blocks by initially calculating a mean value for all pixels from one of said blocks, said texture analyzer then utilizing said mean value to calculate a variance value for said one of said blocks, said variance value quantifying said texture characteristics for said one of said blocks.

10. The system of claim 9 wherein said texture analyzer calculates said mean value according a formula:

$$MeanValue = \frac{\sum Xi}{N}$$

where said Xi is a pixel value at a pixel location "i", and said N is a total number of pixels in said one of said blocks.

11. The system of claim 10 wherein said texture analyzer calculates said variance value according a formula:

$$VarianceValue = \frac{\sum (Xi - MeanValue)^2}{N}.$$

12. The system of claim 1 wherein said block categorizer performs a block categorization procedure to categorize said blocks by comparing said texture characteristics for each of said blocks to a flat threshold value, a sensitive, threshold value, and a moderate threshold value, said sensitive threshold value being greater than said flat threshold value, said sensitive threshold value being less than said moderate threshold value.

13. The system of claim 12 wherein said block categorizer associates said each of said blocks with a flat table if a variance value for said each of said blocks is less than said flat threshold value, said block categorizer associating said each of said blocks with a sensitive table if said variance value is greater than said flat threshold value and less than said sensitive threshold, said block categorizer associating said each of said blocks with a moderate table if said variance value is greater than said sensitive threshold value and less than said moderate threshold, said block categorizer associating said each of said blocks with a heavy table if said variance value is greater than or equal to said moderate threshold.

14. The system of claim 1 wherein said coefficients from a given one of said deadzone tables are utilized by said quantizer to perform separate quantization procedures upon different respective ones of said coefficients from a corresponding one of said blocks.

15. The system of claim 1 wherein said deadzone tables include flat tables for flat blocks with flat texture characteristics, sensitive tables for sensitive blocks with subtle texture characteristics, moderate tables for moderate blocks with medium texture characteristics, and heavy tables for heavy blocks with substantial texture characteristics.

16. The system of claim 1 wherein said deadzone values of said deadzone tables are empirically selected by utilizing human visual characteristics to thereby preserve said texture characteristics in said quantized coefficients.

17. The system of claim 1 wherein predefined ones of said deadzone values are subject to a deadzone value emphasis procedure to increase said predefined ones of said deadzone values that correspond to visually important ones of said coefficients, said deadzone value emphasis procedure resulting in smaller deadzone regions that preserve texture information from said visually important ones of said coefficients.

18. The system of claim 17 wherein said visually important ones of said coefficients start from a second coefficient position, and selectably include up to eight subsequent and sequential coefficient positions from said second coefficient position.

19. The system of claim 1 wherein said quantizer performs said quantization procedure by utilizing different ones of said deadzone values for individually quantizing respective corresponding ones of said coefficients.

20. The system of claim 19 wherein said quantizer performs said quantization procedure according to a formula:

$$Z = \lfloor (|W| + f(i)*(1 << q\_bits)) >> q\_bits \rfloor * sgn(W)$$

where said Z is one of said quantized coefficients, said W is a corresponding one of said coefficients before being quantized, said f(i) is an associated one of said deadzone values for a coefficient position "i", said q_bits is a standard value based upon a quantization parameter and a current coefficient position, and said sgn(W) is an initial sign of said W.

21. The system of claim 20 wherein said quantizer alleviates computational complexities of floating point multiplication by defining a modified deadzone value F(i) to be equal to said deadzone value f(i) times a value 1024, said modified deadzone value being rounded to a nearest integer value.

22. The system of claim 19 wherein said quantizer performs said quantization procedure according to a formula:

$$Z = \lfloor (|W| + F(i)*(1 << q\_bits - 10)) >> q\_bits \rfloor * sgn(W)$$

where said Z is one of said quantized coefficients, said W is a corresponding one of said coefficients before being quantized, said F(i) is a modified associated one of said deadzone values for a coefficient position "i", said q_bits is a standard value based upon a quantization parameter and a current coefficient position, and said sgn(W) is an initial sign of said W.

23. The system of claim 1 wherein said deadzone values in said deadzone tables support quantization weighting procedures by providing different ones of said deadzone values for individually quantizing each of said coefficients during said quantization procedure.

24. A method for performing an adaptive encoding procedure, comprising:
   determining texture characteristics for blocks of image data;
   converting said blocks of image data into coefficients that represent said blocks;
   utilizing said texture characteristics to associate texture categories with said coefficients from said blocks;
   storing deadzone values that define deadzone regions for performing a quantization procedure; and
   accessing said deadzone values based upon said texture categories to convert said coefficients of said blocks into quantized coefficients.

25. The method of claim 24 wherein a texture analyzer calculates said texture characteristics for one of said blocks by initially calculating a mean value for all pixels from one of said blocks, said texture analyzer then utilizing said mean value to calculate a variance value for said one of said blocks, said variance value quantifying said texture characteristics for said one of said blocks.

26. The method of claim 25 wherein said texture analyzer calculates said mean value according a formula:

$$MeanValue = \frac{\sum Xi}{N}$$

where said Xi is a pixel value at a pixel location "i", and said N is a total number of pixels in said one of said blocks.

27. The method of claim 26 wherein said texture analyzer calculates said variance value according a formula:

$$VarianceValue = \frac{\sum (Xi - MeanValue)^2}{N}.$$

28. The method of claim 24 wherein a block categorizer performs a block categorization procedure to categorize said blocks by comparing said texture characteristics for each of said blocks to a flat threshold value, a sensitive, threshold value, and a moderate threshold value, said sensitive threshold value being greater than said flat threshold value, said sensitive threshold value being less than said moderate threshold value.

29. The method of claim 28 wherein said block categorizer associates said each of said blocks with a flat table if a variance value for said each of said blocks is less than said flat threshold value, said block categorizer associating said each of said blocks with a sensitive table if said variance value is greater than said flat threshold value and less than said moderate threshold, said block categorizer associating said each of said blocks with a moderate table if said variance value is greater than said sensitive threshold value and less than said moderate threshold, said block categorizer associating said each of said blocks with a heavy table if said variance value is greater than or equal to said moderate threshold.

30. A system for performing an adaptive encoding procedure, comprising:
   means for determining texture characteristics for blocks of image data;
   means for converting said blocks of image data into coefficients that represent said blocks;
   means for utilizing said texture characteristics to associate texture categories with said coefficients from said blocks;
   means for storing deadzone values that define deadzone regions for performing a quantization procedure; and
   means for accessing said deadzone values based upon said texture categories to convert said coefficients of said blocks into quantized coefficients.

* * * * *